No. 663,928. Patented Dec. 18, 1900.
J. C. PRATT.
PULLEY.
(Application filed Apr. 12, 1900.)
(No Model.) 3 Sheets—Sheet 1.
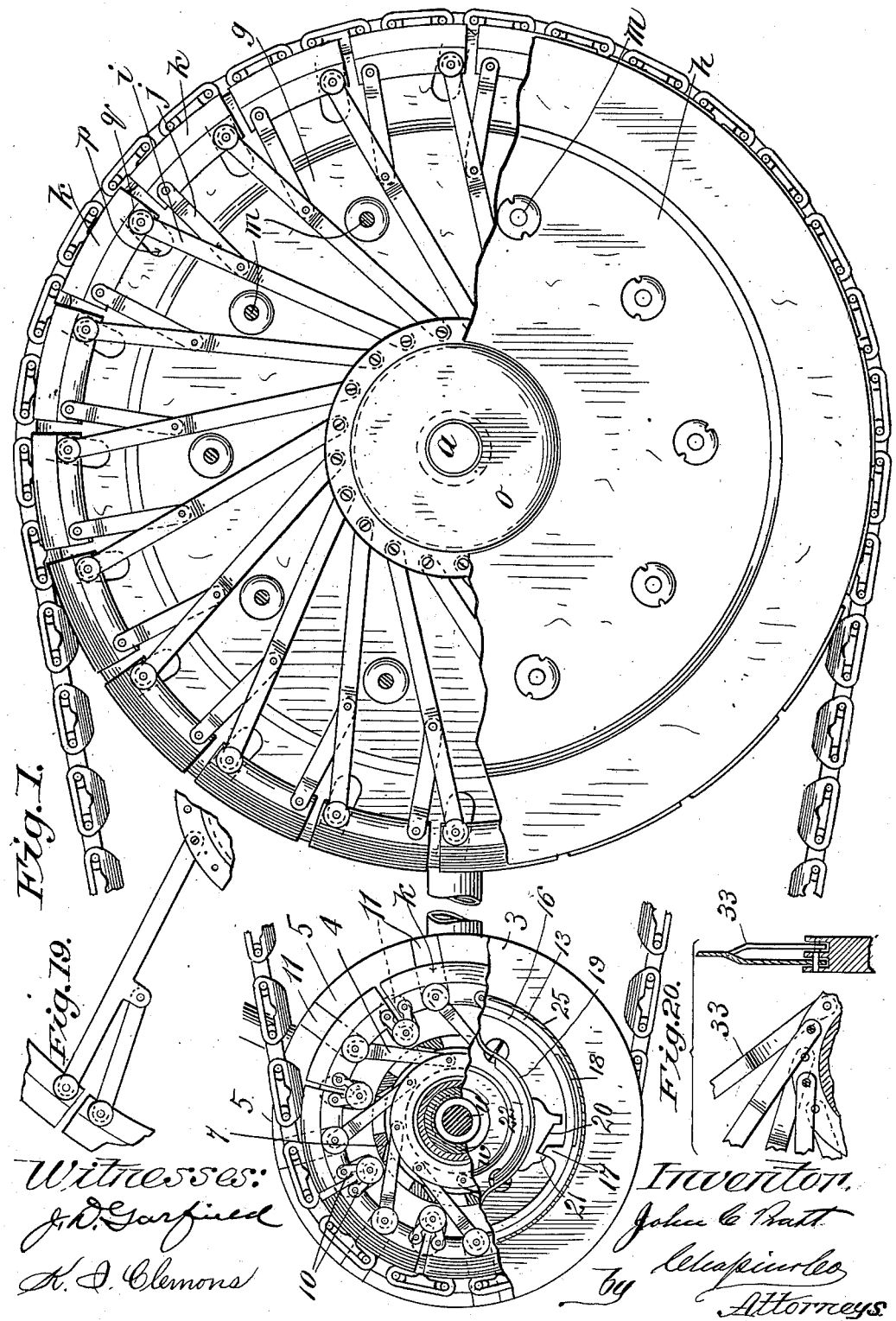

No. 663,928. Patented Dec. 18, 1900.
J. C. PRATT.
PULLEY.
(Application filed Apr. 12, 1900.)
(No Model.) 3 Sheets—Sheet 2.
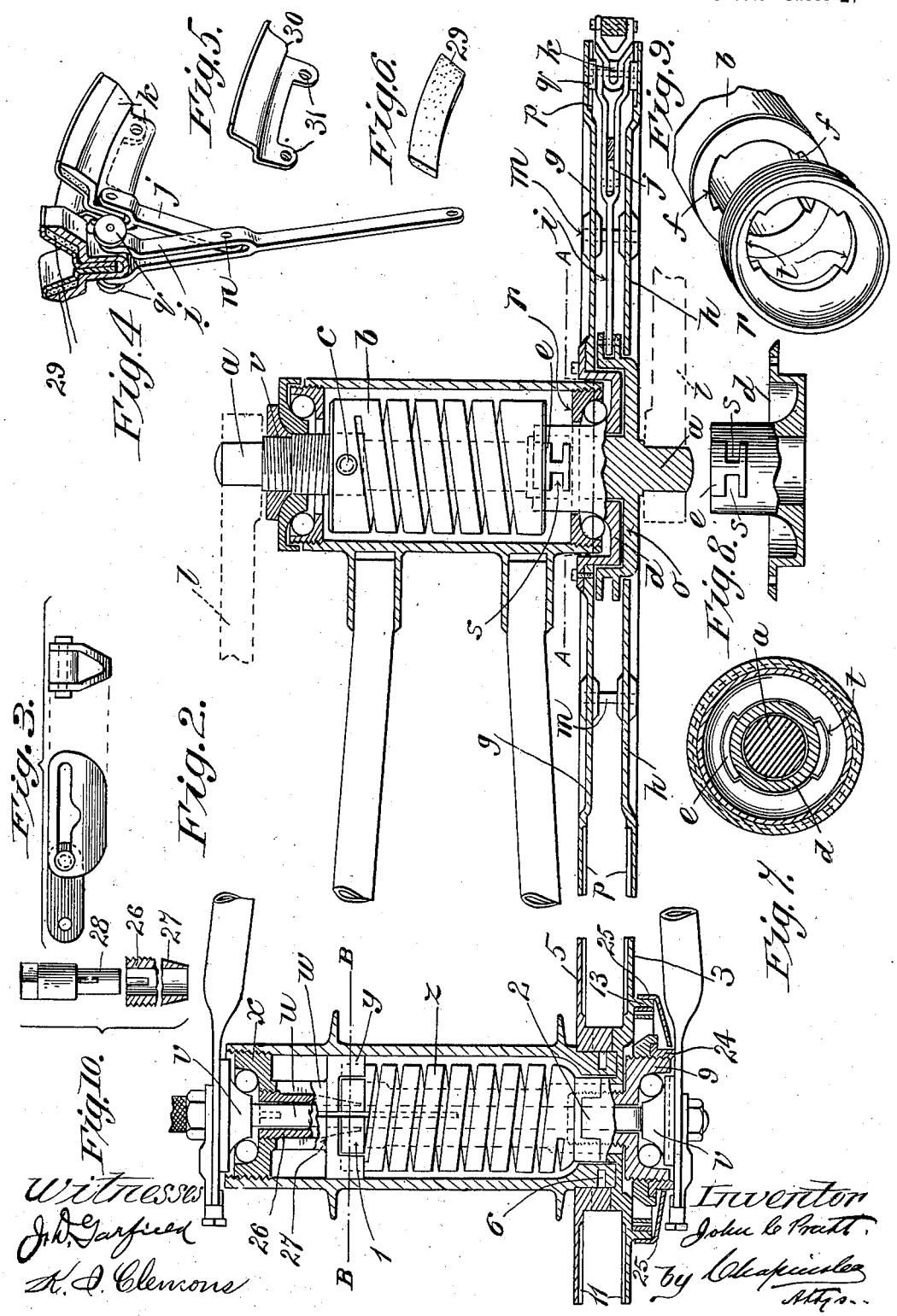

No. 663,928.  
J. C. PRATT.  
PULLEY.  
(Application filed Apr. 12, 1900.)  
Patented Dec. 18, 1900.
(No Model.)  
3 Sheets—Sheet 3.
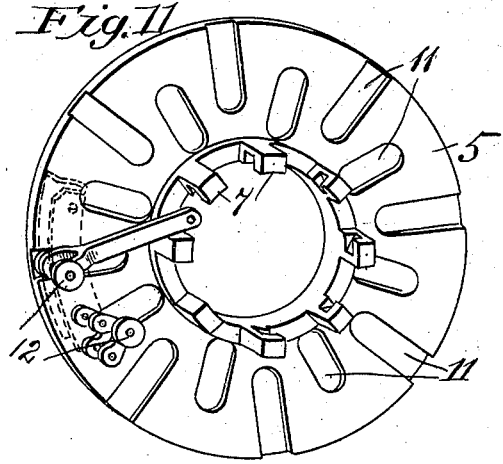
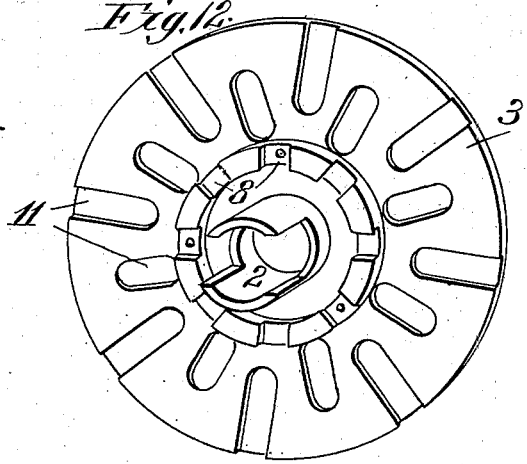
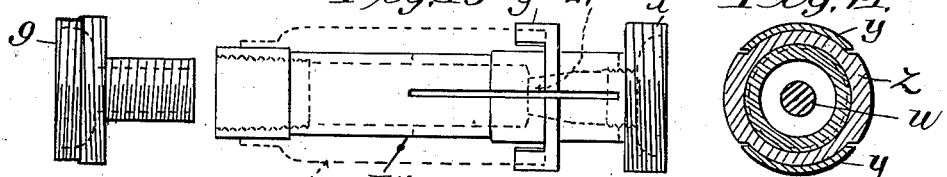
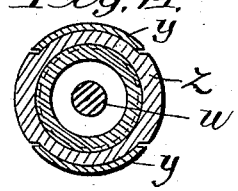
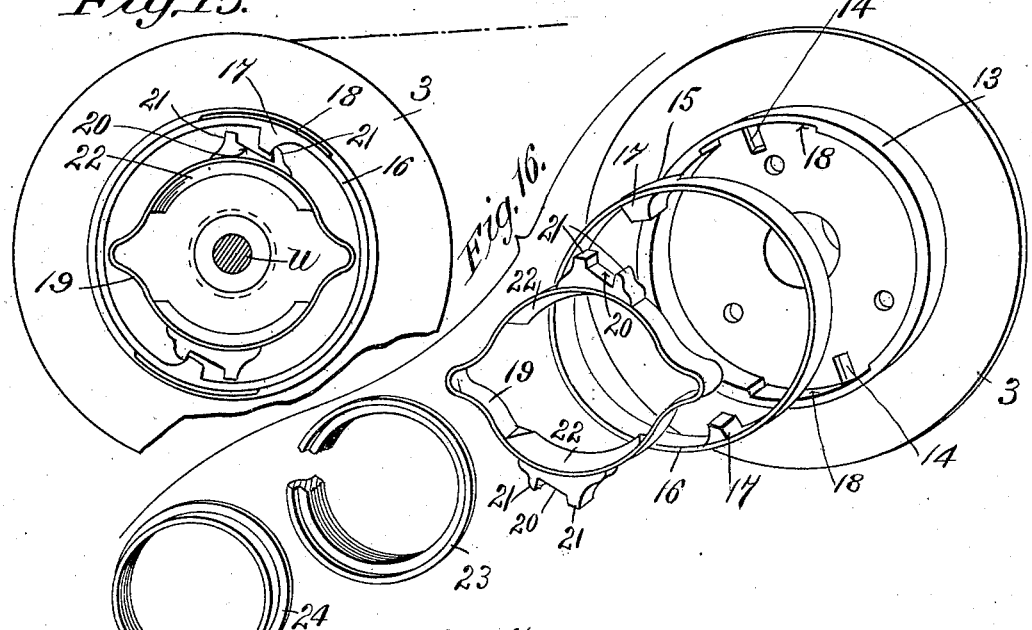
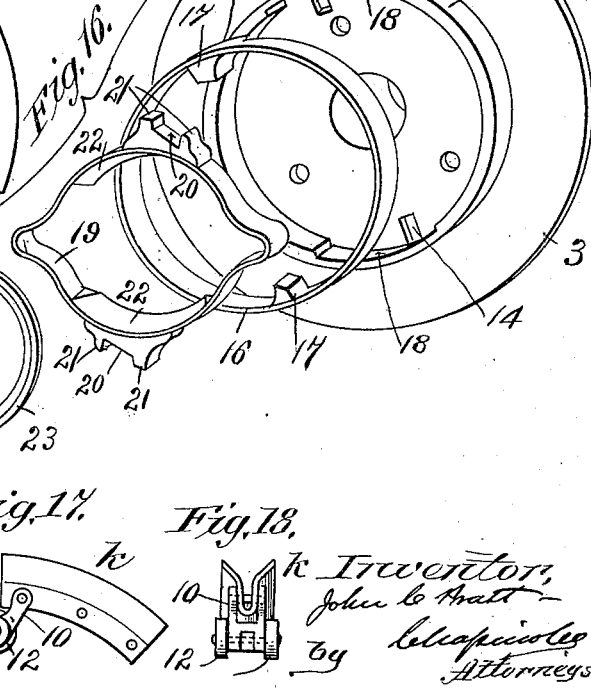
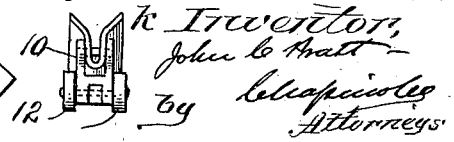

UNITED STATES PATENT OFFICE.

JOHN C. PRATT, OF HARTFORD, CONNECTICUT.

PULLEY.

SPECIFICATION forming part of Letters Patent No. 663,928, dated December 18, 1900.

Application filed April 12, 1900. Serial No. 12,592. (No model.)

*To all whom it may concern:*

Be it known that I, JOHN C. PRATT, a citizen of the United States of America, residing at Hartford, in the county of Hartford and State of Connecticut, have invented new and useful Improvements in Pulleys for Power Transmission, of which the following is a specification.

This invention relates to power transmission from one shaft to another by a flexible connection or belt; and the object of the invention lies in the construction of mechanism for reducing the diameter of the driving pulley or wheel and for increasing the diameter of the driven pulley or wheel whenever the amount of resistance to rotation, which either one or the other of said pulleys or wheels is subjected to, exceeds a certain maximum quantity.

This invention is in the nature of an improvement on my United States Letters Patent dated December 27, 1898, No. 616,630; and it consists in the improved construction of devices for the purposes above set forth, all as fully hereinafter described, and pointed out in the claims.

In the drawings forming part of this specification the devices are shown as applied to a bicycle, though they are equally applicable to any driving and driven shafts. Figure 1 is a side elevation of a driving and driven pulley, the flexible connection between them being in the form of a chain. Parts of each pulley are broken away to better show their construction. Fig. 2 is a top plan sectional view of the parts shown in Fig. 1, the chain and some of the parts shown in Fig. 1 being omitted. Fig. 3 is a detail drawing of the chain. Fig. 4 is a perspective view of one and part of another of the segments which constitute the periphery of the driving-wheel and of the arms which support them. Fig. 5 is a perspective view of one of the thin metal linings for a peripheral segment of the driving-wheel. Fig. 6 is a perspective view of an elastic cushion which is applied to the inner sides of the segments against which the chain bears. Fig. 7 is a cross-section through the hub on line A A, Fig. 2. Fig. 8 is a part of the hub of the wheel, but removed therefrom and partly broken away. Fig. 9 is a perspective view of the end of the retracting-spring in the hub and of the ball-case. Fig. 10 is a sectional view of an expander-nut and also showing in full lines the wrench for turning it. Fig. 11 is a perspective view of a part of the driven wheel-hub, and Fig. 12 is a similar view of another part of said hub. Fig. 13 is a sleeve through which the rear axle passes and on which is supported the rear hub. Fig. 14 is a sectional view on line B B, Fig. 2, but not showing the barrel of the hub. Fig. 15 is a view of the opposite side of the hub shown in Fig. 12. Fig. 16 shows in perspective and in separated relation the parts whereby a certain resistance to action is applied to the driven hub. Fig. 17 shows in side elevation two of the peripheral segments of the driven pulley and their connection one with the other. Fig. 18 is an end view of the segments shown in Fig. 17. Fig. 19 shows a modified construction of the spokes. Fig. 20 shows a manner of offsetting the spokes at the point of their attachment to the hub.

As above stated, when the resistance applied to the chain or belt connecting the driving and driven pulleys exceeds a certain maximum quantity said driving-pulley automatically contracts to a smaller diameter, and the opposite result takes place in the driven pulley—that is to say, it expands to a greater than its normal diameter. The mechanism whereby this result is attained in the driving-pulley is constructed and arranged as follows: An axle $a$ is provided with a stiff coiled spring $b$, one end of which is secured to the axle by a pin $c$, and the opposite end of said spring is connected with a circular plate $d$. This connection between the plate and the spring is established positively by the engagement of the lugs $e$ on said plate $d$, with the recesses $f$ in the end of the spring adapted to receive them, the parts being assembled as shown in Fig. 2. Said plate $d$ serves as a support for the disk $g$, between which and a similar disk $h$, supported in parallelism therewith, are located the series of spokes $i$ and their spoke-levers $j$, to the outer extremities of which are pivotally attached segments $k$, which constitute the expansible and contractible periphery of the wheel or pulley.

In the application of this device to a bicycle, as shown herein, the driving-axle $a$ is provided with a pair of cranks $l$. The disks $g$ and $h$ are rigidly united together by the posts $m$. These posts are provided with suitable shoulders to maintain the two disks in their proper separated relation, screw-threaded ends of the posts passing through the disks having nuts screwed thereon, as shown in Fig. 1. The spoke-levers $j$ are shorter than the spokes $i$ and are pivotally hung on the latter at $n$, the end of the spoke being forked to receive the spoke-lever. The extremities of both the spoke-lever and the spoke are adapted to receive contiguous ends of two peripheral segments, the end of the spoke-lever being forked to adapt it to this use. Said segments are substantially Y-shaped in cross-section (see Fig. 4) and are adapted to receive the links (V-shaped in cross-section) of the chain or flexible driving connection. One of said links is shown in end and side elevation in Fig. 3, together with one of the blocks whereby the links are united.

In case a belt were used instead of the driving connection illustrated in Fig. 2, the cross-sectional form of the segments would then be T-shaped, or they may be of any other shape to adapt them to other forms of driving connection.

A hub-like disk $o$, preferably forming part of the axle $a$, is adapted to support the spokes $i$, whose inner ends are entered in a peripheral groove in said disk $o$, within which they are confined by screws or pins on which they may freely swing. As shown in Fig. 1, these spokes are disposed diagonally to the radii of the driving-wheel. In assembling these parts the disk $g$ and the circular plate $d$ may be first secured together. The spokes may then be attached to the disk $o$ of the axle $a$, the latter then being passed through the hub of the plate $d$, the segments then being secured to the end of the spokes and the spoke-levers arranged in proper relation one to the other. The disk $h$ is then applied to the disk $g$, and the two are screwed together, as stated.

In order that the contraction and expansion of the diameter of the driving-wheel may always take place concentrically and in order that the ends of the spokes and wheel-segments may have proper support against the draft of the belt or other driving connection running on the pulley, supports are provided for both the spokes and the said peripheral segments, which supports consist of a series of grooves $p$, formed in the inner surface of the disks $g$ and $h$, extending from the periphery of the latter toward the center, within which lie antifriction-rolls $q$, which are supported on the pins in the ends of the spoke-levers which pass through and support one end of the segments.

The axle $a$ is supported in the usual manner in the crank-hanger on balls interposed between suitable cones on the axle and ball-cups screwed into the ends of the crank-hanger. There is one novel feature, however, to which attention is directed, which consists in the use of the circular plate $d$ as a wrench for the adjustment of the cup $r$, and this adjustment is effected by loosening the axle-nut on the opposite end of the axle sufficiently to allow the latter to be drawn through the cup $r$ until the notches $s$ in the lugs $e$ on the plate $d$ will engage the end of the cut-away portion $t$ of the ball-cup (see Fig. 9) and rotate the latter. The spring $b$ being pinned to the axle $a$ will obviously be drawn back with the latter, and therefore sufficient space is left between the end of the spring and the cup $r$ to permit the engagement of the notch $s$, as aforesaid, with said cup. By thus manipulating the parts said cup may be adjusted relative to the cone, which is formed at the base of the hub on the plate $d$, and after said adjustment is effected a slight turn will bring the lug $e$ on the hub of the plate $d$ into registering position with the slot in the cup, and the axle may be pushed back into the hanger in proper position and secured there in the usual manner by the check-nut on the opposite end of the axle.

It will be seen from the above description that one end of the spring $b$ is rigidly secured to the axle and the opposite end of the spring is positively coupled to the hub of the plate $d$, on which the disks $g$ and $h$ are mounted, and the spokes supporting the peripheral segments are supported on the disk $o$, which forms part of the axle. Hence if sufficient resistance to rotation be applied to the periphery of the driving-wheel to overcome the resistance of the spring $b$ further rotational movement of the axle beyond this point will result in the movement of the disks $g$ and $h$ relative to the axle—that is to say, the spokes will remain relatively stationary and the disks will travel ahead of them rotatively, which will cause said spokes to be still further inclined diagonally relative to the radius of the wheel, thus causing the segments on their outer extremities to be drawn inward and reduce the diameter of the circle formed by the segment in proportion to the increase of the inclination of the spoke-levers. A release of the resistance on the periphery of the wheel will permit the parts to resume the positions shown in Fig. 1 by the action of the spring $b$ in its return to a position of rest.

The driven wheel or pulley operates in the reverse direction to the driving-wheel, and its diameter enlarges by the application to its periphery of an amount of power exceeding the resistance of a coiled spring on its axle, as in the case of a driving-wheel just described. In principle the two wheels are of like construction; but differences exist in their arrangement, due principally to the application on the driven wheel of an adjustable resistance whereby when the parts have been operated to expand the periphery of the wheel the retraction of the spring on the axle thereof will not operate to suddenly reduce its diameter at a time when the crank (in the case of the use of the invention on a bicycle) are on "dead-centers" during each revolution thereof.

The construction of the driven wheel is as follows: A cylindrical axle $u$ is provided for this wheel, having the cones $v$ secured thereon in the usual manner and non-rotatably secured in proper supports. In this case, as stated, the support is the frame of the bicycle, the devices being applied to the hub of the rear wheel of the machine. Fitting over the axle is a sleeve $w$, (shown in Fig. 13,) and on one end thereof are two flanges—one, $x$, on the extreme end and the other, $y$, between that end and the center of the sleeve. The flange $x$ is threaded to screw into the end of the barrel of the hub, and in its outer surface an annular depression is turned to receive the balls on which the sleeve rotates. One of the cones $v$ supports said balls in the usual manner. (See Fig. 2.) The flange $y$ receives one end of a coiled spring $z$, which is connected therewith by lugs 1, interlocking with a slot cut transversely in the flange, and the opposite end of the spring engages in a similar manner with the hub 2 of a disk 3, which is the outer one, or two disks, between which the spoke-levers 4 are located, the inner disk being indicated by 5. The ends of the levers enter an annular groove 6 in the barrel of the hub and are secured pivotally therein by screws or pins. The inner disk 5 interlocks with the outer disk 3 by means of projections 7 and slots 8, formed on flanges of said disk, projecting one toward the other. (See Figs. 11 and 12.) It will be noted that the projections on one of said disks are of less height than those on the other, whereby when the disks are interlocked a space will be left through which the spoke-levers 4 may pass, and to provide room for the movement of said levers a part of the lower edge of the projections on the disk 5 is cut away, as shown in Figs. 1 and 11. The disk 5 has a bearing on the barrel of the hub and the disk 3 partly outside and partly inside of the end thereof, that part of said disk having a bearing on the inside of the barrel being the hub thereof, which interlocks with the end of the spring $z$. These parts are assembled by putting the cone on the step end of the axle, screwing the flange $x$ on the sleeve into the barrel, putting the spring $z$ on the sleeve and engaging the end of the spring with the flange $y$, then inserting the hub of the disk 3 in the end of the barrel and into engagement with the end of the spring, the disk 5 having previously been slipped over the end of the barrel, and the projections and slots 7 and 8 are then brought into engagement. To hold these parts in position, a piece 9 (shown in Fig. 13) is then screwed into the end of the sleeve $w$. This piece is provided with a left-hand thread and serves to lock the two disks in their proper position, the flanged head of said piece being turned out to form a ball-cup. The axle passes through this piece 9, and on the end thereof is the cone $v$, between which and said ball-cup the balls are located in the usual manner.

The arrangement of the spoke-levers 4 of the driven pulley or wheel is quite similar to that of the driving-wheel, except that the segments which together form the periphery of the wheel are united one to another end to end by means of short jointed elbow-levers 10, and the spoke-levers 4 are pivotally attached to the segments about midway thereof. This permits the expansion and contraction of the periphery in the same manner as in the driving-wheel. To provide for the concentric expansion and contraction of the periphery of this wheel, means similar to those employed on the driving-wheel are provided, consisting of radial slots 11 in the inner faces of the two disks, and antifriction-rolls are located on the pivot-pins which unite the ends of said elbow-levers and also on the pins which pivotally attach the ends of the spoke-levers 4 to the segments. Said antifrictional rolls are indicated by 12. It is obvious that should it become necessary to apply sufficient power to a crank-operated shaft to overcome the resistance of the spring $b$ every time the said cranks pass over the dead-centers the retraction of said spring would effect an enlargement of the periphery of the driving-wheel, so that if no means were provided for preventing the springing back of the parts to normal positions when said cranks were on centers there would be under certain conditions alternate contraction and expansion of the periphery of the wheels, according as the pressure was applied to the cranks or they were momentarily relieved from pressure on their dead-centers.

To prevent the quick reaction of either the spring in the driving or in the driven wheels under above conditions, a frictional resistance has been applied to the driven pulley or wheel whereby a gradual return to normal position of the parts operating on the periphery of the wheel is provided for, and the construction of said frictional resistance is as follows: An annular flange 13 is turned on the outside of the disk 3, and close to the inner wall of said flange are two oppositely-located depressions 14 (see Fig. 16) in the disk for the reception of the ends of lugs 15 on a ring 16, on which are two beveled cam-lugs 17. Recesses 18 are made in the flange 13 over the lugs 15 to allow the ring 16 to yield at that point. Within said ring 16 is located a spring-ring 19 of a suitable form to adapt it to compression, and on the outer face of said ring 19 are located beveled cams 20, adapted to engage the inwardly-extending cam-lugs 17. The operative surfaces of the cams 20 lie between two upstanding projections 21, whereby said spring-ring 19 is maintained in proper relation to the ring 16.

On the inner face of the spring-ring 19 and under the cam 20 are the tapered friction-surfaces 22. The piece 9, which screws into the end of the sleeve $w$, which fits over the axle of the driven wheel, is provided with a right and left hand thread on the outside of the flanged head thereof, as shown in Fig. 13, and a ring 23 is screwed onto said head on one of said threads and its check-nut 24 reversely screwed up against it to lock it thereon. Said ring 23 is provided with an exterior tapered surface having the same taper as the friction-surfaces 22 of the ring 19, and when said ring 23 is in proper position the said two tapered surfaces lie in contact with each other, the ring 23 being screwed up far enough to expand the ring 19 sufficiently to cause normally a slight resistance to the rotation of the latter. As long as the power applied to the periphery of the driven pulley is not sufficient to overcome the resistance of the spring $z$ there will be no movement of the disk 3 relative to the cylindrical axle $u$; but when that resistance is overcome the said movement of the disk then takes place, and the cam-lugs 17 strike on the projections 21 at the forward end of the beveled cams 20, and the spring-ring 19 is moved with said disk, the extreme limit of its movement being shown in Fig. 15. When the pressure on the cranks is released, the coiled spring $z$ throws the disks 3 and 5 backward, and then the cam-lugs 17 engage the similarly-tapered surfaces of the cams 20, compressing the ring 19 and causing an increased frictional resistance between the tapered friction-surfaces 22 and the fixed ring 23, whereby the return of all of the parts to normal position is made gradually.

A dust-cap 25 is fitted over the flange 13 on the disk 3 to exclude grit from the devices inclosed by it.

As hereinbefore stated in the description of the construction of the rear hub, the sleeve $w$ is screwed into the barrel of the hub by the flange $x$, and a second flange $y$ is connected with one end of the coiled spring $z$, whose opposite end interlocks with the hub of the disk 3. It is found that it is desirable to be able to adjust the tension of the spring $z$, and to that end an expanding nut or bushing 26 is inserted in the sleeve through the flange $x$, as shown in Fig. 2, which sleeve is slitted for a certain distance extending through and each side of the flange $y$, and the interior of the sleeve is provided with a tapered surface 27, (shown in Figs. 2 and 13,) against which the tapered bushing 26 may bear. This screw-threaded bushing 26 is turned in or out by a key 28, (shown in Fig. 10,) which is fitted with a feather adapted to engage the groove on the interior of the bushing, said key being provided with a squared head over which a socket-wrench may be fitted for manipulating it, or said key may be made long enough, if desired, to be manipulated beyond the end of the hub, in which case it would be provided with a T-head to be grasped by the hand. To increase the tension of the spring $z$, whereby more force will be required to expand the periphery of the driven wheel, the axle must be removed, the disk constituting the driven wheel be turned in a direction to put said spring under tension, and while held in this position the bushing 26 must be screwed up sufficiently to effect the expansion of the flange $y$ against the inner walls of the barrel of the hub. This expansion of said flange is sufficient to hold the latter in fixed relation to the barrel.

It has been found desirable on some accounts to provide a more or less yielding surface for the links of the driving-chain to bear against, and therefore the inner surfaces of the segments $k$ are provided, as shown in Fig. 4, with a thin cushion 29 of some elastic material, and over this cushion is applied a thin armor-plate of sheet metal, (indicated by 30,) between which and the inner side of the segment the cushion is inclosed. Said armor-plates 30 are made, preferably, of sheet-steel and have lugs 31 thereon which extend downward between the necks of the segments far enough to receive the pin which secures the latter to the spokes and the spoke-levers. These cushions for the segments may be omitted, if desired, and the chain be permitted to bear directly against the tapered sides of the segments, between which they are adapted to be drawn by the power applied to the chain with sufficient force to effect a strong frictional contact between them, to the end that the chain or driving connection may not slip. A further advantage in cushioning the segments which constitute the periphery of the wheel lies in the fact that the noise of the chain when running thereon is almost entirely deadened.

In Fig. 19 is shown a modification of the spoke construction shown in the other figures of the drawings. This consists in providing a short arm 32 on the body of the spoke which extends at right angles thereto and which is forked to receive the end of the spoke-lever $j$. When this form of spoke is used, the spoke itself is connected with the segment with which the spoke-lever $j$ is shown to be connected in Fig. 1, and the spoke-lever of Fig. 19 is connected to the segment with which the spoke is shown connected in Fig. 1. In other words, the spoke and its spoke-lever are reversed as compared with their engagement with the segments shown in Fig. 1. The purpose of this spoke construction is to provide for the equal movement of contiguous ends of the peripheral segments during the radial movements of the latter when the periphery of the wheel is expanded and contracted.

In Fig. 20 is shown another slight modification of the arrangement of the spokes relative to the hub of the wheel, which consists in making two annular grooves around the hub in which the ends of the spokes are pivoted instead of one, as shown in Fig. 2, and in making a bend in the spokes, as at 33, Fig. 20, whereby while the inner ends of said spokes will enter alternately the two grooves in the hub the outer ends of said spokes will lie in the same plane. By means of this construction I am enabled to use a hub of smaller diameter than would otherwise be possible, for when the periphery of the wheel is contracted and the spokes lie at a greater inclination to the radii of the wheel than in an expanded position the inner ends of the spokes will not interfere with each other, as would be the case if they were one forward of the other in a single groove instead of being offset, as shown.

Having thus described my invention, what I claim, and desire to secure by Letters Patent of the United States, is—

1. A wheel or pulley having an expansible and contractible periphery composed of radially-movable segments, combined with a frictional device whereby, upon the expansion or contraction of said periphery, the movement thereof in the opposite direction will be retarded, substantially as described.

2. The combination with a driving and a driven pulley having a flexible member for transmitting movement from one to the other of said wheels or pulleys, and each of the latter having an expansible and contractible periphery, of friction devices on said driven pulley whereby, when the periphery of the latter is expanded, the movement of said periphery in the opposite direction will be retarded, substantially as described.

3. A pulley, having an expansible and contractible periphery, comprising a shaft, a coiled spring thereon having a rotative engagement therewith, a disk loose on said shaft and interlocking with one end of said spring, spokes pivoted to said shaft in a position inclined to the radii thereof, segments pivotally supported on said spokes, ball-cups for supporting said shaft, and means for moving said interlocking disk on said shaft into engagement with one of said ball-cups for adjusting the latter, substantially as described.

4. In an expansible and contractible wheel or pulley, a shaft, a disk loose thereon, a series of spokes pivoted by one end on said disk and inclined to the radii thereof, segments constituting the periphery of said wheel or pulley, a pivotal support for one end of each of said segments on the outer end of said spokes, spoke-levers pivoted to said spokes for pivotally engaging the opposite ends of said segments, a coiled spring on said shaft, rotating therewith, and a positive engagement between said spring and said hub, substantially as described.

5. In an expansible and contractible wheel, a barrel-hub, a non-rotatable shaft, a sleeve rotatable thereon, spokes pivotally hung by one end on said hub, two interlocking disks rotatably supported on the end of said sleeve between which said spokes are located, and with which they engage, and means of engagement between one of said disks and said spring; segments constituting the periphery of said wheel, jointed elbow-levers uniting the contiguous ends of said segments, and pivotal connections between said segments and said spokes, there being radial slots in said two interlocking disks, and friction-rolls on said spokes and elbow-levers engaging said slots, substantially as described.

6. In an expansible and contractible wheel comprising radially-moving segments which constitute its periphery, and operated by the movement of one rotating part of said wheel relative to another, the combination therewith of friction devices whereby the movements of said parts are retarded, which devices consist of an annular flange 13, and a ring 16 therein engaging one of said parts and having cam projections thereon, a spring-ring 19 within the ring 16, a friction-ring 23 on another of said parts, against which said spring 19 is compressed by the engagement of said cam projections with said spring-ring, when one of said parts is operated relative to the other, substantially as described.

7. In an expansible and contractible wheel, a series of segments constituting the periphery of said wheel, there being a groove in said segments for receiving a drive-chain, and means for cushioning the sides of said groove on which said chain bears, substantially as described.

8. In an expansible and contractible wheel, a series of segments constituting the periphery of said wheel, there being a groove in said segments for receiving a drive-chain, a cushion of resilient material disposed along the sides of said grooves, and a metal covering for said material, and means for attaching said covering to said segments, substantially as described.

9. In an expansible and contractible wheel, a barrel-hub, a non-rotatable axle therein, a sleeve thereon rotatable relative to said axle, a coiled spring one end of which is attached to the sleeve, means for expanding the sleeve relative to the hub for locking it therein whereby the tension on said spring may be varied, disks between which spokes are located, means for interlocking said disks and spring, and segments on said spokes which constitute the periphery of said wheel, substantially as described.

10. In an expansible and contractible wheel, a series of spokes therefor, a hub to which said spokes are pivotally attached, and means for connecting said spokes in offset relation one to another on said hub, substantially as described.

11. In an expansible and contractible wheel or pulley, a shaft, a disk loose thereon, a series of spokes, the inner ends of which are offset in opposite directions, two annular grooves in said disk adapted to receive the offset ends of the spokes, means for pivotally securing said spokes in said grooves alternately, segments constituting the periphery of said wheel or pulley, a pivotal support for one end of each of said segments on the outer end of said spokes, spoke-levers pivoted to said spokes for pivotally engaging the opposite ends of said segments, a coiled spring on said shaft, rotating therewith, and a positive engagement between said spring and said hub, substantially as described.

JOHN C. PRATT.

Witnesses:
WM. H. CHAPIN,
K. I. CLEMONS.